(12) United States Patent
Liu et al.

(10) Patent No.: US 12,216,216 B2
(45) Date of Patent: Feb. 4, 2025

(54) LOW-ALTITUDE FREQUENCY DOMAIN ELECTROMAGNETIC DETECTION DEVICE AND ELECTROMAGNETIC DETECTION METHOD

(71) Applicants: Kunming Prospecting Design Institute Of China Nonferrous Metals Industry Co., Ltd, Kunming (CN); Kunming Survey Institute Technology development Co., LTD, Kunming (CN); China Nonferrous Metals Changsha Survey and Design Institute Co., LTD, Changsha (CN)

(72) Inventors: Wenlian Liu, Kunming (CN); Sugang Sui, Kunming (CN); Huipeng Liu, Kunming (CN); Fang Wang, Kunming (CN); Leiyun Qian, Kunming (CN); Xiuchi Dai, Kunming (CN); Nianchun Du, Kunming (CN)

(73) Assignees: Kunming Prospecting Design Institute Of China Nonferrous Metals Industry Co., Ltd, Kunming (CN); Kunming Survey Institute Technology development Co., LTD, Kunming (CN); China Nonferrous Metals Changsha Survey and Design Institute Co., LTD, Changsha (CN)

( * ) Notice: Subject to any disclaimer, the term of this patent is extended or adjusted under 35 U.S.C. 154(b) by 0 days.

(21) Appl. No.: 18/670,643

(22) Filed: May 21, 2024

(65) Prior Publication Data
US 2024/0319384 A1    Sep. 26, 2024

(30) Foreign Application Priority Data
Aug. 8, 2023   (CN) .......................... 202310987676.3

(51) Int. Cl.
*G01S 19/35*    (2010.01)
*G01S 19/37*    (2010.01)
*H01Q 1/28*    (2006.01)

(52) U.S. Cl.
CPC .............. *G01S 19/35* (2013.01); *G01S 19/37* (2013.01); *H01Q 1/285* (2013.01)

(58) Field of Classification Search
CPC .......... G01S 19/35; G01S 19/37; H01Q 1/285
(Continued)

(56) References Cited

FOREIGN PATENT DOCUMENTS

| AU | 2007202492 B2 * | 3/2010 | .............. G01V 3/165 |
|---|---|---|---|
| CA | 2586225 A1 | 10/2008 | |

(Continued)

OTHER PUBLICATIONS

CNIPA, Notification of First Office Action for Chinese application CN202310987676.3, Sep. 13, 2023.
(Continued)

*Primary Examiner* — Chuong P Nguyen
(74) *Attorney, Agent, or Firm* — Hemisphere Law, PLLC; Zhigang Ma (57) ABSTRACT

A low-altitude frequency domain electromagnetic detection device and an electromagnetic detection method are disclosed. A transmitting wireframe, a receiving wireframe I, a transmitting and receiving system and a receiving wireframe II of the detection device are connected with supporting rods at intervals, and the supporting rods are connected with an unmanned aerial vehicle. A sine wave generation module of the transmitting and receiving system is connected with the transmitting wireframe, the receiving wireframes I and II are connected with a dual-channel synchronous data acquisition module, and the dual-channel synchronous data acquisition module is connected with a main control module. The main control module controls the sine wave generation module,
(Continued)

receives data of an altimeter, a GNSS module and the dual-channel synchronous data acquisition module and records the data in a storage module. The electromagnetic detection method comprises equipment assembly, coefficient calibration, data acquisition and normalized secondary field calculation.

8 Claims, 4 Drawing Sheets

(58) Field of Classification Search
USPC .................................... 342/357.75, 357.77
See application file for complete search history.

(56) References Cited

FOREIGN PATENT DOCUMENTS

| | | | | | |
|---|---|---|---|---|---|
| CN | 1714303 | A | * | 12/2005 | ............. G01V 3/165 |
| CN | 109270579 | A | * | 1/2019 | ............... G01V 3/10 |
| CN | 114265121 | A | | 4/2022 | |
| CN | 114488315 | A | * | 5/2022 | ............... G01V 3/08 |
| CN | 115586583 | A | | 1/2023 | |
| CN | 115826069 | A | | 3/2023 | |
| CN | 115826069 | B | * | 5/2023 | ............... G01V 3/10 |

OTHER PUBLICATIONS

CNIPA, Notification to grant patent right for Chinese application CN202310987676.3, Oct. 9, 2023.

\* cited by examiner

LOW-ALTITUDE FREQUENCY DOMAIN ELECTROMAGNETIC DETECTION DEVICE AND ELECTROMAGNETIC DETECTION METHOD

TECHNICAL FIELD

The present disclosure belongs to the technical field of geophysical exploration, and particularly relates to a low-altitude frequency domain electromagnetic detection device which is simple and light in structure, small in data volume, high in detection accuracy and strong in anti-interference ability, and an electromagnetic detection method.

BACKGROUND

The aerial frequency domain electromagnetic method is based on the principle of frequency domain electromagnetic exploration, which puts the transmitting coil and receiving coil on the aircraft to identify and judge the geological body buried in 100 m depth. The aerial frequency domain electromagnetic method has high detection efficiency and is often used in large area groundwater survey, environmental geological survey and engineering survey.

At present, the flight operation height of the aerial frequency domain electromagnetic method is generally 30 meters to 50 meters. The application mechanism is mainly divided into two steps: first, the transmitter emits electromagnetic waves of a specific frequency to the transmitting coil, and the receiving coil obtains the inducted electromotive force of a specific frequency, and the receiver collects and stores the data; subsequently, the normalized secondary field of the operating frequency is obtained through data processing, and the apparent resistivity is obtained. In order to obtain different detection depths, a plurality of groups of transmitting and receiving systems are used in the aerial frequency domain electromagnetic exploration equipment. Since the normalized secondary field caused by the geological body is weak when the above-mentioned electromagnetic wave transmission and reception are high above the ground, in order to enhance the response of the normalized secondary field, high-power transmitting equipment and high-precision receiving devices are required. As a result, the existing aerial frequency domain electromagnetic method exploration equipment weighs several hundred kilograms. In order to reduce the weight of the aerial frequency domain electromagnetic detection system, for example, Geophex Company of the United States, based on the multi-frequency simultaneous transmission and reception technology, uses two groups of reversely-connected receiving coils to suppress the primary field, effectively improves the acquisition accuracy of the secondary field, and effectively realizes the multi-frequency operation of a plurality of groups of transceiver coils, thereby reducing the weight of exploration equipment. However, the GEM-2A detection system produced by it also weighs about 110 kg, and still needs to be mounted on a traditional helicopter to carry out operations. Because the use of traditional helicopters for detection work is not only costly, but also requires airspace use reporting in advance, it is difficult to promote its use in the field of engineering survey and environmental survey. In addition, for example, the GEM-2A detection system uses two groups of receiving coils with different turns in order to reduce weight, but because the resonant frequencies of the two groups of receiving coils are different, the frequency selection is limited during multi-frequency operation.

In recent years, with the rapid development of unmanned aerial vehicles such as multi-rotor unmanned aerial vehicles and remote-controlled airships, it provides the possibility of flexible application for low-altitude exploration operations with a flight height of less than 10 meters. At present, the load of civil multi-rotor unmanned aerial vehicles is generally less than 30 kg. When the flight height is less than 10 meters, although the emission power requirements for electromagnetic detection devices are reduced, the weight of equipment under multi-frequency simultaneous working conditions should still be considered. Moreover, in the prior art, the aerial frequency domain electromagnetic method exploration work only stores the original time series data, and the amount of data after each work is relatively large. For example, if sampling is performed at 24 bits 100 kSample/s, dual-channel acquisition for 1 h would yield an amount of data of about 2 Gb. Uploading 2 Gb of data to a cloud server for storage not only requires a long data transfer time, but also takes up a large storage space. In addition, due to the huge amount of collected data, the transmission is limited, so that the existing exploration equipment can only use communication cables for on-site control, which limits the high-security application of unmanned control; or the airborne survey can only be performed according to a preset route, and then the data is downloaded later for analysis, and the real-time airborne survey quality control cannot be achieved. For this reason, according to the shortcomings of the existing technology, how to realize the lightweight of the frequency domain electromagnetic exploration device, so as to realize the low-cost and flexible application in the field of engineering investigation and environmental investigation, and to ensure the accuracy of the exploration results is the key technical problem that needs to be solved urgently at present.

SUMMARY

In accordance with the shortcomings of the prior art, the present disclosure provides a low-altitude frequency domain electromagnetic detection device which is simple and light in structure, small in data volume, high in detection accuracy and strong in anti-interference ability, and an electromagnetic detection method of the low-altitude frequency domain electromagnetic detection device.

The low-altitude frequency domain electromagnetic detection device of the present disclosure is realized as follows: including a supporting rod I, a supporting rod II, a transmitting wireframe, a receiving wireframe I, a transmitting and receiving system, a receiving wireframe II, wherein the supporting rods I and II are non-magnetic rigid rods, the transmitting wireframe, the receiving wireframe I and the receiving wireframe II are rectangular frames and wound with a plurality of turns of enameled wires, the number of turns and diameters of the enameled wires of the receiving wireframe I and the receiving wireframe II are the same, the transmitting wireframe, the receiving wireframe I, the transmitting and receiving system and the receiving wireframe II are respectively fixedly connected with the supporting rod I and the supporting rod II at intervals in sequence along the extending direction of transmission and reception of the supporting rod I, and two sides of a frame composed of the supporting rod I and the supporting rod II are respectively connected with an unmanned aerial vehicle through non-magnetic anti-torsion ropes;

the transmitting and receiving system includes a main control module, a storage module, a sine wave generation module, an altimeter module, a GNSS module, a dual-channel synchronous data acquisition module, the transmitting wireframe is in signal connection with the sine wave generation module, the receiving wireframe I and the receiving wireframe II are in signal connection with the dual-channel synchronous data acquisition module, respectively, the sine wave generation module, the altimeter module, the GNSS module and the dual-channel synchronous data acquisition module are in signal connection with the main control module, respectively, and the main control module controls the sine wave generation module and receives data of the altimeter module, the GNSS module and the dual-channel synchronous data acquisition module and records the data in the storage module.

Further, the transmitting wireframe, the receiving wireframe I and/or the receiving wireframe II are provided with a non-magnetic rigid housing, the enameled wires are fixedly arranged inside the non-magnetic rigid housing; the number of turns of the enameled wires of the receiving wireframe I is 8-12 times the number of turns of the enameled wires of the transmitting wireframe.

Further, the transmitting and receiving system is further provided with an adjustable analog signal amplification module, the receiving wireframe II is in signal connection with an input terminal of the adjustable analog signal amplification module, an output terminal of the adjustable analog signal amplification module is in signal connection with the dual-channel synchronous data acquisition module.

Further, the supporting rod I and the supporting rod II are parallel and of equal length to each other, and two sides of the frame composed of the supporting rod I and the supporting rod II are connected with the unmanned aerial vehicle through four symmetrical anti-torsion ropes, respectively; the frame composed of the supporting rod I and the supporting rod II is not less than 5 m apart from a foot stand of the unmanned aerial vehicle.

Further, the dual-channel synchronous data acquisition module includes an A/D analog-to-digital conversion module and an MCU digital acquisition controller, and an input terminal of the A/D analog-to-digital conversion module is in signal connection with the receiving wireframe I and the receiving wireframe II respectively for converting an analog signal of induced electromotive force of the receiving wireframe into a digital signal; an input terminal and an output terminal of the MCU digital acquisition controller are in signal connection with the A/D analog-to-digital conversion module and the main control module respectively for controlling the A/D analog-to-digital conversion module and transmitting digital signal data to the main control module.

Further, the main control module further performs Fast Fourier Transform on received time series data acquired by the receiving wireframe I and the receiving wireframe II in seconds to convert the data into an amplitude corresponding to an operating frequency, the normalized secondary field PPM calculation is subsequently performed, and the position coordinate data acquired by the GNSS module and the flight height data acquired by the altimeter module at the same time are collated with the normalized secondary field PPM data, and recorded in the storage module.

Further, the normalized secondary field PPM calculation is performed by using an equation (15), an equation (16) and an equation (17):

$$V22 = \frac{nV2 - V1}{n - 1}, \quad (15)$$

$$V21 = V2 - V22 = V2 - \frac{nV2 - V1}{n - 1}, \quad (16)$$

$$PPM = \frac{V22}{V21}, \quad (17)$$

wherein: $V1$ is the induced electromotive force of the receiving wireframe I, $V2$ is the induced electromotive force of the receiving wireframe II, $V21$, $V22$ are the primary field and secondary field induced electromotive forces of the receiving wireframe II, respectively, and the unit is V; $n$ is the calibration factor of the receiving wireframe I and the receiving wireframe II.

The electromagnetic detection method of the present disclosure based on the low-altitude frequency domain electromagnetic detection device is realized by including the following steps:

A. Equipment assembly: fixing a transmitting wireframe, a receiving wireframe I, a transmitting and receiving system, and a receiving wireframe II in sequence at intervals between a supporting rod I and a supporting rod II which are parallel to form a fixed frame structure, enabling the receiving wireframe I and the receiving wireframe II in signal connection with the dual-channel synchronous data acquisition module, respectively and the sine wave generation module, the altimeter module, the GNSS module and the dual-channel synchronous data acquisition module in signal connection with the main module, respectively, and then suspending the fixed frame structure below the unmanned aerial vehicle with a plurality of non-magnetic anti-torsion ropes;

B. Coefficient calibration: controlling the unmanned aerial vehicle to take off to a height above the effective depth detection capability of the receiving wireframe I, then controlling the sine wave generation module to generate signals and transmitting electromagnetic waves through the transmitting wireframe, reading the induced electromotive forces $V1$, $V2$ of the receiving wireframe I and the receiving wireframe II by the main control module, then calculating a calibration factor $n=V1/V2$, and adjusting an amplification factor of the adjustable analog signal amplification module to n;

C. Data acquisition: controlling the unmanned aerial vehicle to perform operations according to a designed course, controlling the sine wave generation module by the main control module of the transmitting and receiving system and transmitting electromagnetic waves through the transmitting wireframe, synchronously receiving the data of the altimeter module, the GNSS module and the dual-channel synchronous data acquisition module, recording the position coordinates, the flight height and the induced electromotive force time series data of the receiving wireframe I and the receiving wireframe II in the storage module in real time; and D. Normalized secondary field calculation: performing Fast Fourier Transform on the received time series data acquired by the receiving wireframe I and the receiving wireframe II to convert the data into an amplitude corresponding to an operating frequency by the main control module, performing normalized secondary field PPM calculation subsequently, and collating the position coordinate data acquired by the GNSS module and the flight height data acquired by the altimeter module at the corresponding time with the normalized secondary field PPM data, and recording the data in the storage module.

Further, in the D step, the normalized secondary field PPM calculation is performed by using an equation (15), an equation (16) and an equation (17):

$$V22 = \frac{nV2 - V1}{n-1}, \tag{15}$$

$$V21 = V2 - V22 = V2 - \frac{nV2 - V1}{n-1}, \tag{16}$$

$$PPM = \frac{V22}{V21}, \tag{17}$$

wherein: V1 is the induced electromotive force of the receiving wireframe I, V2 is the induced electromotive force of the receiving wireframe II, V21, V22 are the primary field and secondary field induced electromotive forces of the receiving wireframe II, respectively, and the unit is V; n is the calibration factor of the receiving wireframe I and the receiving wireframe II.

Further, the present disclosure further includes a qualitative judgment step, wherein the qualitative judgment is to use the position coordinates, the flight height and the PPM data recorded in the storage module to qualitatively judge an abnormal geological body with resistivity difference: according to the flight altitude and the PPM data, obtaining the apparent resistivity by using the nomogram searching method, and taking an average value of the apparent resistivity recorded for consecutive 10 s as the background apparent resistivity, when the apparent resistivity is higher than 130% of the average value of the apparent resistivity, qualitatively judging the geological body as a high-resistivity abnormal geological body; when the apparent resistivity is lower than 50% of the average value of the apparent resistivity, qualitatively judging the geological body as a low-resistivity abnormal geological body; when the apparent resistivity is in the range from being higher than 50% of the average value of the apparent resistivity to being lower than 130% of the average value of the apparent resistivity, judging the geological body as a normal geological body.

Advantageous Effects of the Disclosure are:

1. Based on the frequency domain electromagnetic exploration principle, aiming at the fact that the low-altitude frequency domain electromagnetic exploration with a flight height less than 10 meters can reduce the emission power, the disclosure proposes a frame structure detection device that is easy to install and unload, thus greatly reduces the weight of the exploration equipment, and enabling the device to be carried on low-altitude unmanned aerial vehicles such as civil-grade multi-rotor unmanned aerial vehicles and remote-controlled airships to carry out low-altitude frequency domain electromagnetic method exploration work, which is convenient for solving the exploration problem of areas that cannot be reached by local personnel in engineering investigation and environmental investigation work.

2. The disclosure creatively uses the receiving wireframe I and the receiving wireframe II with the same size and turn number to extract the primary field generated by the transmitting wireframe and the secondary field generated by the eddy current excited by the geological body, and proposes a method for obtaining the calibration coefficient n of the two groups of receiving wireframes, and adjusts the amplification intensity of the analog signal of the receiving wireframe II according to n, so that the exploration device can arbitrarily select the working frequency when the multi-frequency operation is carried out, and the sampling accuracy of the analog signal is also improved, thereby ensuring the accuracy of the exploration result.

3. The main control module of the disclosure creatively performs Fast Fourier Transform on the induced electromotive force time series data received by two receiving coils in seconds, and then performs normalized secondary field calculation, and collates the GNSS position coordinates, the height data from the ground with the normalized secondary field data at the same time, so that the 2 Gb time series data can be reduced to about 170 Kb, while significantly reducing the data transmission amount, it also reduces the consumption of storage resources, and improves the calculation speed of later data processing, and finally provides a technical basis for realizing the remote real-time control of data acquisition by users.

4. By adopting the non-magnetic anti-torsion ropes to connect the frame composed of the supporting rod I and the supporting rod II with the unmanned aerial vehicle, the disclosure can effectively reduce or even eliminate the self-rotation of the frame in the flight process, thereby ensuring the stability of the airborne survey platform and effectively improving the effectiveness of the aerial survey data. In particular, a number of turns of enameled wires of the transmitting wireframe, the receiving wireframe I and the receiving wireframe II are arranged in a non-magnetic rigid housing. The non-magnetic rigid housing can play a role in protecting the enameled wires, and the number of turns of enameled wires of the receiving wireframe I and the receiving wireframe II is 8 to 12 times that of the transmitting wireframe. It can not only improve the depth detection capability of the receiving coil to the secondary field signal, but also reduce the overall weight by the transmitting wireframe with fewer turns. In particular, the center-to-center distance from the transmitting wireframe to the receiving wireframe II is at least 4 times the center-to-center distance from the transmitting wireframe to the receiving wireframe I, which can effectively reduce the interference of the primary field of the transmitting wireframe to the secondary field received by the receiving wireframe II, thereby improving the signal accuracy of the receiving wireframe II.

In view of the above, the present disclosure significantly reduces the weight of the low-altitude frequency domain electromagnetic detection device, and also realizes multi-frequency operation to arbitrarily select the operation frequency, and also improves the detection accuracy, and the whole device is simple and light in structure, small in data volume, high in detection accuracy and strong in anti-interference ability.

In the figures: 1—supporting rod I, 2—supporting rod II, 3—transmitting wireframe, 4—receiving wireframe I, 5—transmitting and receiving system, 51—dual-channel simultaneous data acquisition module, 6—receiving wireframe II, 7—anti-torsion rope, 8—unmanned aerial vehicle, 9—geological body.

DETAILED DESCRIPTION

The present disclosure will now be further described with reference to the accompanying drawings and examples, but is not to be construed as limiting the disclosure in any way, and any variations or modifications thereof based on the teachings of the present disclosure are intended to be within the scope of the present disclosure.

Figure 1:
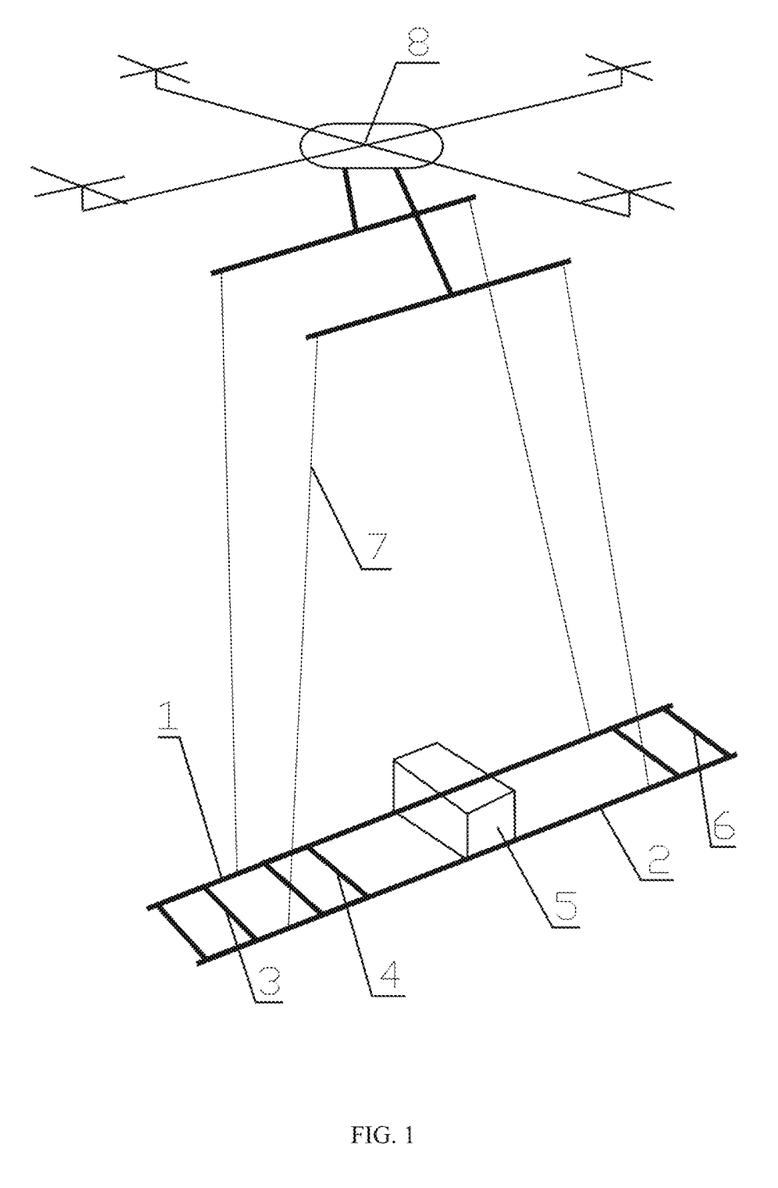
FIG. 1 is a schematic diagram illustrating the general structure of a low-altitude frequency domain electromagnetic detection device according to the present disclosure.
Figure 4:
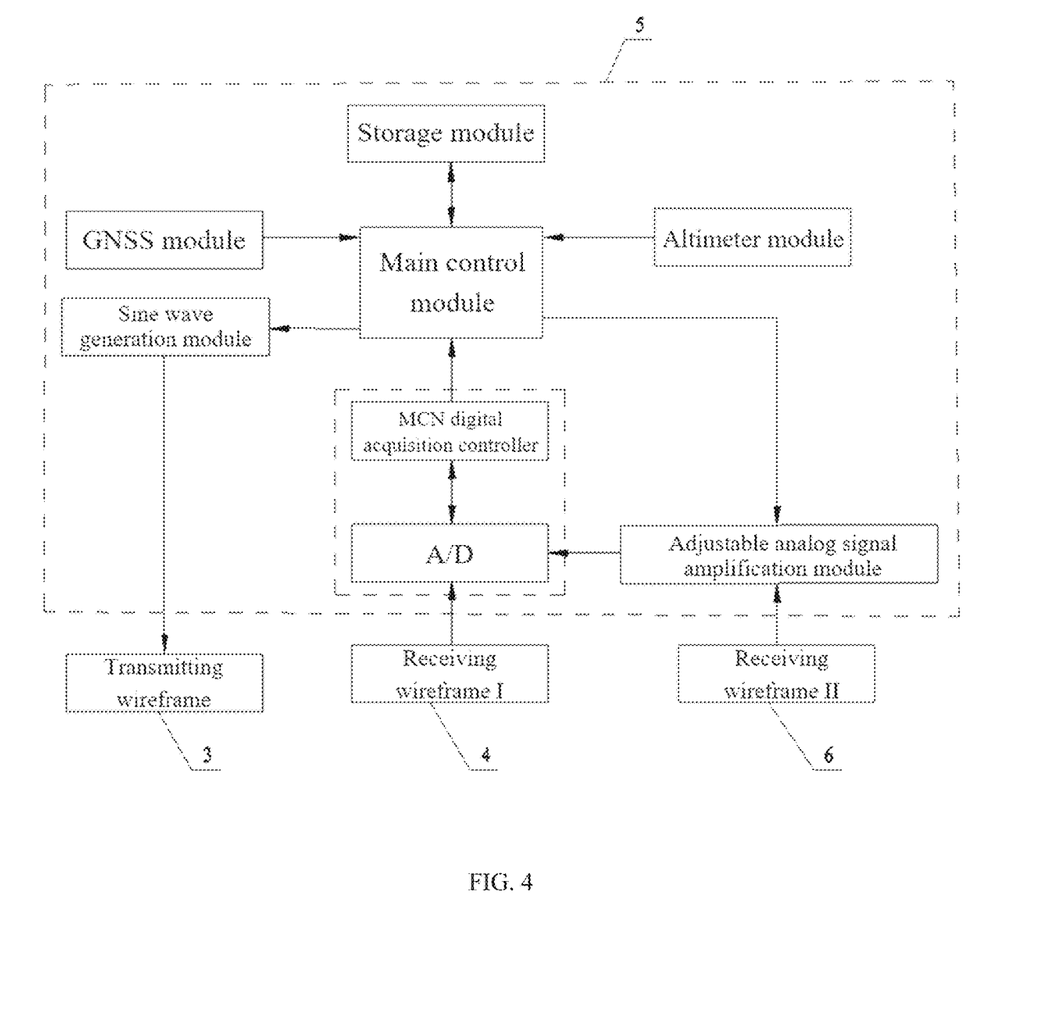
FIG. 4 is a block diagram of a transmitting and receiving system of FIG. 1 and a connection structure thereof.

As shown in FIGS. 1 to 4, a low-altitude frequency domain electromagnetic detection device of the present disclosure includes a supporting rod I 1, a supporting rod II 2, a transmitting wireframe 3, a receiving wireframe I 4, a transmitting and receiving system 5, a receiving wireframe II 6, wherein the supporting rods I 1 and II 2 are non-magnetic rigid rods, the transmitting wireframe 3, the receiving wireframe I 4 and the receiving wireframe II 6 are rectangular frames and wound with a plurality of turns of enameled wires, the number of turns and diameters of the enameled wires of the receiving wireframe I 4 and the receiving wireframe II 6 are the same, the transmitting wireframe 3, the receiving wireframe I 4, the transmitting and receiving system 5 and the receiving wireframe II 6 are respectively fixedly connected with the supporting rod I 1 and the supporting rod II 2 at intervals in sequence along the extending direction of the supporting rod I 1, and two sides of a frame composed of the supporting rod I 1 and the supporting rod II 2 are respectively connected with an unmanned aerial vehicle 8 through non-magnetic anti-torsion ropes 7;

the transmitting and receiving system 5 includes a main control module, a storage module, a sine wave generation module, an altimeter module, a GNSS module, a dual-channel synchronous data acquisition module 51, the transmitting wireframe 3 is in signal connection with the sine wave generation module, the receiving wireframe I 4 and the receiving wireframe II 6 are in signal connection with the dual-channel synchronous data acquisition module 51, respectively, the sine wave generation module, the altimeter module, the GNSS module and the dual-channel synchronous data acquisition module 51 are in signal connection with the main control module, respectively, and the main control module controls the sine wave generation module and receives data of the altimeter module, the GNSS module and the dual-channel synchronous data acquisition module 51 and records the data in the storage module.

The transmitting wireframe 3, the receiving wireframe I 4 and/or the receiving wireframe II 6 are provided with a non-magnetic rigid housing, the enameled wires are fixedly arranged inside the non-magnetic rigid housing; the number of turns of the enameled wires of the receiving wireframe I 4 is 8-12 times the number of turns of the enameled wires of the transmitting wireframe 3.

The center-to-center distance from the transmitting wireframe 3 to the receiving wireframe II 6 is at least 4 times the center-to-center distance from the transmitting wireframe 3 to the receiving wireframe I 4.

The dual-channel synchronous data acquisition module 51 includes an A/D analog-to-digital conversion module and an MCU digital acquisition controller, and an input terminal of the A/D analog-to-digital conversion module is in signal connection with the receiving wireframe I 4 and the receiving wireframe II 6 respectively for converting an analog signal of induced electromotive force of the receiving wireframe into a digital signal; an input terminal and an output terminal of the MCU digital acquisition controller are in signal connection with the A/D analog-to-digital conversion module and the main control module respectively for controlling the A/D analog-to-digital conversion module and transmitting digital signal data to the main control module.

As shown in FIG. 4, the transmitting and receiving system 5 is further provided with an adjustable analog signal amplification module, the receiving wireframe II 6 is in signal connection with an input terminal of the adjustable analog signal amplification module, an output terminal of the adjustable analog signal amplification module is in signal connection with the dual-channel synchronous data acquisition module 51.

A control terminal of the adjustable analog signal amplification module is in signal connection with the main control module.

Figure 2:
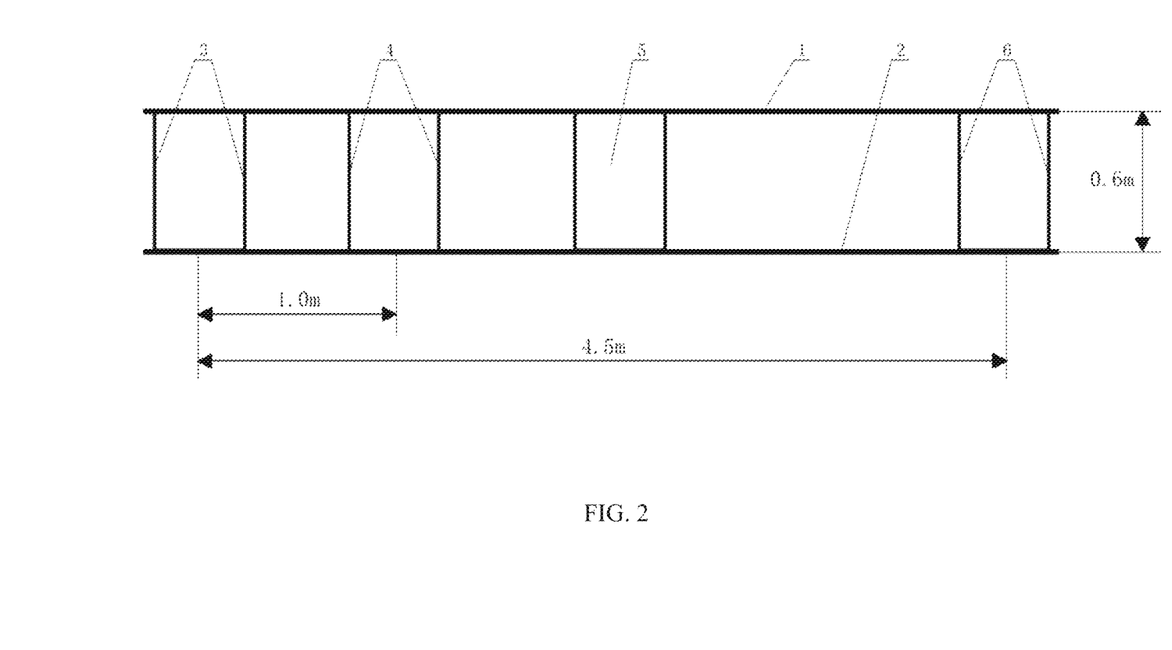
FIG. 2 is a plan view of supporting rods and a connecting structure thereof according to the embodiment.

The supporting rod I 1 and the supporting rod II 2 are parallel and of equal length to each other, and two sides of the frame composed of the supporting rod I 1 and the supporting rod II 2 are connected with the unmanned aerial vehicle 8 through four symmetrical anti-torsion ropes 7, respectively.

The supporting rods 11 and II 2 are carbon fiber round rods, rigid plastic round rods or non-magnetic titanium alloy rods.

The frame composed of the supporting rod I 1 and the supporting rod II 2 is not less than 5 m apart from a foot stand of the unmanned aerial vehicle 8.

The main control module further performs Fast Fourier Transform on received time series data acquired by the receiving wireframe I 4 and the receiving wireframe II 6 in seconds to convert the data into an amplitude corresponding to an operating frequency, the normalized secondary field PPM calculation is subsequently performed, and the position coordinate data acquired by the GNSS module and the flight height data acquired by the altimeter module at the same time are collated with the normalized secondary field PPM data, and recorded in the storage module.

The normalized secondary field PPM calculation is performed by using an equation (15), an equation (16) and an equation (17):

$$V22 = \frac{nV2 - V1}{n-1}, \quad (15)$$

$$V21 = V2 - V22 = V2 - \frac{nV2 - V1}{n-1}, \quad (16)$$

$$PPM = \frac{V22}{V21}, \quad (17)$$

wherein: V1 is the induced electromotive force of the receiving wireframe I 4, V2 is the induced electromotive force of the receiving wireframe II 6, V21, V22 are the primary field and secondary field induced electromotive forces of the receiving wireframe II 6, respectively, and the unit is V; n is the calibration factor of the receiving wireframe I 4 and the receiving wireframe II 6.

The main control module collates the data by taking the second as the unit and integrates the position coordinate data and the flight height data acquired at the same time with the normalized secondary field PPM data at the same time to form the time-based time data.

The unmanned aerial vehicle 8 is a multi-rotor unmanned aerial vehicle, a fixed wing unmanned aerial vehicle or an unmanned airship.

The main control module is a PC, a PLC, a single board computer or an industrial computer.

The anti-torsion rope 7 is a non-metallic rope.

The sine wave generation module is an existing arbitrary sine wave generator which can meet the electromagnetic detection frequency range, the altimeter module is an ultrasonic range finder, the GNSS module is an existing arbitrary GNSS antenna and a GNSS host, and the dual-channel synchronous data acquisition module 51 is an existing arbitrary high-precision analog-digital dual-channel synchronous data acquisition module.

A power supply battery is fixed between the supporting rod I 1 and the supporting rod II 2, and the power supply battery is connected to the power supply terminal of the transmitting and receiving system 5.

As shown in FIGS. 1 to 4, the electromagnetic detection method of the present disclosure based on the low-altitude frequency domain electromagnetic detection device includes the following steps:

A. Equipment assembly: a transmitting wireframe 3, a receiving wireframe I 4, a transmitting and receiving system 5, and a receiving wireframe II 6 are fixed in sequence at intervals between a supporting rod I 1 and a supporting rod II 2 which are parallel to form a fixed frame structure, the receiving wireframe I 4 and the receiving wireframe II 6 are enabled in signal connection with the dual-channel synchronous data acquisition module 51, respectively and the sine wave generation module, the altimeter module, the GNSS module and the dual-channel synchronous data acquisition module 51 are in signal connection with the main module, respectively, and then the fixed frame structure is suspended below the unmanned aerial vehicle 8 with a plurality of non-magnetic anti-torsion ropes 7;

B. Coefficient calibration: the unmanned aerial vehicle 8 is controlled to take off to a height above the effective depth detection capability of the receiving wireframe I 4, then the sine wave generation module is controlled to generate signals and electromagnetic waves are transmitted through the transmitting wireframe 3, the induced electromotive forces V1, V2 of the receiving wireframe I 4 and the receiving wireframe II 6 are read by the main control module, then a calibration factor n=V1/V2 is calculated, and an amplification factor of the adjustable analog signal amplification module is adjusted to n;

C. Data acquisition: the unmanned aerial vehicle 8 is controlled to perform operations according to a designed course, the main control module of the transmitting and receiving system 5 controls the sine wave generation module and electromagnetic waves are transmitted through the transmitting wireframe 3, the data of the altimeter module, the GNSS module and the dual-channel synchronous data acquisition module 51 are received synchronously, the position coordinates, the flight height and the induced electromotive force time series data of the receiving wireframe I 4 and the receiving wireframe II 6 are recorded in the storage module in real time; and D. Normalized secondary field calculation: Fast Fourier Transform is performed on the received time series data acquired by the receiving wireframe I 4 and the receiving wireframe II 6 to convert the data into an amplitude corresponding to an operating frequency by the main control module, normalized secondary field PPM calculation is performed subsequently, and the position coordinate data acquired by the GNSS module and the flight height data acquired by the altimeter module at the corresponding time is collated with the normalized secondary field PPM data, and the data is recorded in the storage module.

In the step A, an adjustable analog signal amplification module is provided between the receiving wireframe II 6 and the dual-channel synchronous data acquisition module 51, and input and output terminals of the adjustable analog signal amplification module are respectively in signal connection with the receiving wireframe II 6 and the dual-channel synchronous data acquisition module 51.

In the step D, the normalized secondary field PPM calculation is performed by using an equation (15), an equation (16) and an equation (17):

$$V22 = \frac{nV2 - V1}{n - 1}, \tag{15}$$

$$V21 = V2 - V22 = V2 - \frac{nV2 - V1}{n - 1}, \tag{16}$$

$$PPM = \frac{V22}{V21}, \tag{17}$$

wherein: V1 is the induced electromotive force of the receiving wireframe I 4, V2 is the induced electromotive force of the receiving wireframe II 6, V21, V22 are the primary field and secondary field induced electromotive forces of the receiving wireframe II 6, respectively, and the unit is V; n is the calibration factor of the receiving wireframe I 4 and the receiving wireframe II 6.

The present disclosure further includes a qualitative judgment step, wherein the qualitative judgment is to use the position coordinates, the flight height and the PPM data recorded in the storage module to qualitatively judge an abnormal geological body with resistivity difference: according to the flight altitude and the PPM data, the apparent resistivity is obtained by using the nomogram searching method, and an average value of the apparent resistivity recorded for consecutive 10 s is taken as the background apparent resistivity, when the apparent resistivity is higher than 130% of the average value of the apparent resistivity, the geological body is qualitatively judged as a high-resistivity abnormal geological body; when the apparent resistivity is lower than 50% of the average value of the apparent resistivity, the geological body is qualitatively judged as a low-resistivity abnormal geological body; when the apparent resistivity is in the range from being higher than 50% of the average value of the apparent resistivity to being lower than 130% of the average value of the apparent resistivity, the geological body is judged as a normal geological body.

In the data acquisition step, the sine wave generation module has an emission period of 102 to 104 Hz; the sampling frequency of the receiving wireframe I 4 and the receiving wireframe II 6 is more than 5 times the frequency generated by the sine wave generation module; the altimeter module is an ultrasonic range finder or an infrared laser range finder and measures at a frequency greater than 10 Hz.

Example 1

As shown in FIGS. 1 to 4, the airborne survey process is as follows:

1. The transmitting wireframe 3, the receiving wireframe I 4, the transmitting and receiving system 5, and the receiving wireframe II 6 are fixed in sequence at intervals between the supporting rod I 1 and the supporting rod II 2 which are parallel to form a fixed frame structure (the supporting rods I 1 and II 2 are carbon fiber round rods having an outer diameter of 20 mm and a length of 5 m), the receiving wireframe I 4 and the receiving wireframe II 6 are enabled in signal connection with the dual-channel synchronous data acquisition module 51 of the transmitting and receiving system 5, respectively. The adjustable analog signal amplification module is arranged between the receiving wireframe II 6 and the dual-channel synchronous data acquisition module 51, the sine wave generation module, the altimeter module, the GNSS module and the dual-channel synchronous data acquisition module 51 are respectively in signal connection with the main control module, then the fixed frame structure is suspended horizontally below the agricultural multi-rotor unmanned aerial vehicle (i.e. the unmanned aerial vehicle 8) having a load capacity of more than 15 kg with a plurality of non-magnetic anti-torsion ropes 7, and the distance from the transmitting wireframe 3 to the foot stand of the unmanned aerial vehicle 8 is 5 m; wherein, the transmitting wireframe 3 is wound with 100 turns of enameled wires of φ1.2 mm to form a frame shape of 600 mm×400 mm, the receiving wireframe I 4 and the receiving wireframe II 6 are each wound with 1000 turns of enameled wires of φ0.35 mm to form a frame shape of 600 mm×400 mm, and then each of the enameled wires is fixed in the non-magnetic rigid housing.

2. The multi-rotor unmanned aerial vehicle is controlled to take off to a height (e.g., greater than 50 meters) above the effective depth detection capability of the receiving wireframe I 4, then the sine wave generation module is controlled to generate signals and electromagnetic waves are transmitted through the transmitting wireframe 3, the induced electromotive forces V1, V2 of the receiving wireframe I 4 and the receiving wireframe II 6 are read by the main control module, then a calibration factor n=V1/V2 is automatically calculated by the main control module, and then the main control module adjusts an amplification factor of the adjustable analog signal amplification module to n.

Figure 3:
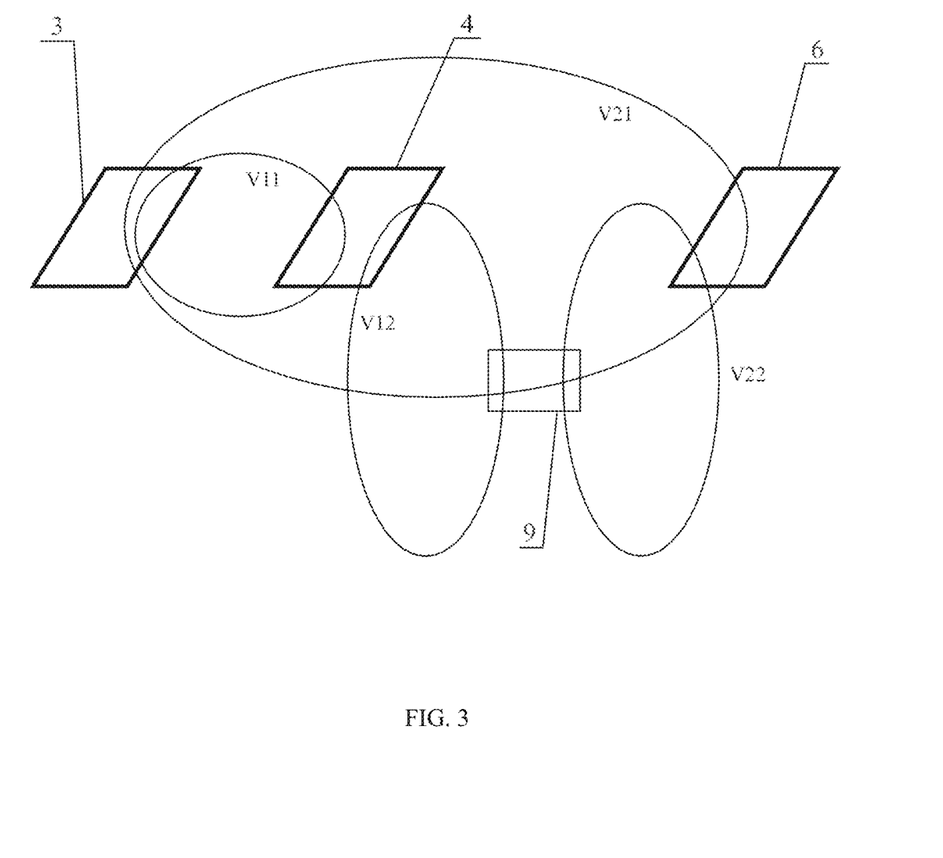
FIG. 3 is a schematic diagram of low-altitude frequency domain electromagnetic detection according to the present disclosure.

As shown in FIG. 3, the induced electromotive force reading of the receiving wireframe I 4 is V1, including a primary field V11 and a secondary field V12, with the relationship as follows:

$$V1 = V11 + V12, \qquad (11)$$

the induced electromotive force reading of the receiving wireframe II 6 is V2, including a primary field V21 and a secondary field V22, with the relationship as follows:

$$V2 = V21 + V22, \qquad (12)$$

when the multi-rotor unmanned aerial vehicle takes off to a height above the effective depth detection capability of the receiving wireframe I 4, the magnitude of the secondary field can be neglected and it is assumed that only the primary field generated by the transmitting wireframe is contained in the received induced electromotive force. At this point:

$$V11 = nV21, \qquad (13)$$

wherein, n is the scaling factor for the two groups of receiving wireframes.

3. The multi-rotor unmanned aerial vehicle performs operations according to a designed course, the main control module of the transmitting and receiving system 5 controls the sine wave generation module and electromagnetic waves with varying field strengths and frequencies are transmitted through the transmitting wireframe 3, the data of the altimeter module, the GNSS module and the dual-channel synchronous data acquisition module 51 are synchronously received, and the position coordinates, the flight height and the induced electromotive force time series data of the receiving wireframe I 4 and the receiving wireframe II 6 are recorded in the storage module in real time.

As shown in FIG. 3, in the low-altitude flight probe operation, it is considered that the induced electromotive forces caused by the geological body received by the receiving wireframe I 4 and the receiving wireframe II 6 are approximately equal, then:

$$nV2 - V1 = nvV22 - V12 \approx (n-1)V22 \qquad (14)$$

4. The main control module performs Fast Fourier Transform on received time series data acquired by the receiving wireframe I 4 and the receiving wireframe II 6 to convert the data into an amplitude corresponding to an operating frequency, the normalized secondary field PPM calculation is subsequently performed, and the position coordinate data acquired by the GNSS module and the flight height data acquired by the altimeter module at the corresponding time are collated with the normalized secondary field PPM data, and recorded in the storage module. Wherein, the normalized secondary field PPM calculation is performed by using an equation (15), an equation (16) and an equation (17):

$$V22 = \frac{nV2 - V1}{n - 1}, \qquad (15)$$

$$V21 = V2 - V22 = V2 - \frac{nV2 - V1}{n - 1}, \qquad (16)$$

$$PPM = \frac{V22}{V21}, \qquad (17)$$

wherein: V1 is the induced electromotive force of the receiving wireframe I 4, V2 is the induced electromotive force of the receiving wireframe II 6, V21, V22 are the primary field and secondary field induced electromotive forces of the receiving wireframe II 6, respectively, and the unit is V; n is the calibration factor of the receiving wireframe I 4 and the receiving wireframe II 6.

5. After the airborne survey is completed, the abnormal geological body with the resistivity difference is qualitatively judged by reading the data in the storage module of the transmitting and receiving system 5, and using the position coordinates, the flight altitude and the PPM data: according to the flight altitude and the PPM data, the apparent resistivity is obtained by using the nomogram searching method (Wu Chengping, Wang Weiping, Hu Xiangyun, et al. APPARENT RESISTIVITY CONVERSION AND APPLICATION OF FREQUENCY DOMAIN HELICOPTER AERIAL ELECTROMAGNETIC METHOD [J]. GEOPHYSICALS & CHEMICAL EXPLORATION, 2009, 33 (04): 427-430 +435.), and an average value of the apparent resistivity recorded for consecutive 10 s is taken as the background apparent resistivity, when the apparent resistivity is higher than 130% of the average value of the apparent resistivity, the geological body is qualitatively judged as a high-resistivity abnormal geological body;

when the apparent resistivity is lower than 50% of the average value of the apparent resistivity, the geological body is qualitatively judged as a low-resistivity abnormal geological body; when the apparent resistivity is in the range from being higher than 50% of the average value of the apparent resistivity to being lower than 130% of the average value of the apparent resistivity, the geological body is judged as a normal geological body.

While preferred embodiments of the present disclosure are described above, the scope of protection of the present disclosure is not limited thereto, and any changes or substitutions that can be easily conceived by those skilled in the art within the technical scope of the present disclosure disclosed herein should be covered by the present disclosure. Therefore, the protection scope of the present disclosure should be subject to the protection scope of the claims.

What is claimed is:

1. A low-altitude frequency domain electromagnetic detection device, comprising a supporting rod I (1), a supporting rod II (2), a transmitting wireframe (3), a receiving wireframe I (4), a transmitting and receiving system (5), a receiving wireframe II (6), wherein the supporting rods I (1) and II (2) are non-magnetic rigid rods, the transmitting wireframe (3), the receiving wireframe I (4) and the receiving wireframe II (6) are rectangular frames and wound with a plurality of turns of enameled wires, the number of turns and diameters of the enameled wires of the receiving wireframe I (4) and the receiving wireframe II (6) are the same, the transmitting wireframe (3), the receiving wireframe I (4), the transmitting and receiving system (5) and the receiving wireframe II (6) are respectively fixedly connected with the supporting rod I (1) and the supporting rod II (2) at intervals in sequence along the extending direction of the supporting rod I (1), and two sides of a frame composed of the supporting rod I (1) and the supporting rod II (2) are respectively connected with an unmanned aerial vehicle (8) through non-magnetic anti-torsion ropes (7);

the transmitting and receiving system (5) comprises a main control module, a storage module, a sine wave generation module, an altimeter module, a GNSS module, a dual-channel synchronous data acquisition module (51), the transmitting wireframe (3) is in signal connection with the sine wave generation module, the receiving wireframe I (4) and the receiving wireframe II (6) are in signal connection with the dual-channel synchronous data acquisition module (51), respectively, the sine wave generation module, the altimeter module, the GNSS module and the dual-channel synchronous data acquisition module (51) are in signal connection with the main control module, respectively, and the main control module controls the sine wave generation module and receives data of the altimeter module, the GNSS module and the dual-channel synchronous data acquisition module (51) and records the data in the storage module;

the transmitting and receiving system (5) is further provided with an adjustable analog signal amplification module, the receiving wireframe II (6) is in signal connection with an input terminal of the adjustable analog signal amplification module, an output terminal of the adjustable analog signal amplification module is in signal connection with the dual-channel synchronous data acquisition module (51);

the dual-channel synchronous data acquisition module (51) comprises an A/D analog-to-digital conversion module and an MCU digital acquisition controller, and an input terminal of the A/D analog-to-digital conversion module is in signal connection with the receiving wireframe I (4) and the receiving wireframe II (6) respectively for converting an analog signal of induced electromotive force of the receiving wireframe into a digital signal; an input terminal and an output terminal of the MCU digital acquisition controller are in signal connection with the A/D analog-to-digital conversion module and the main control module respectively for controlling the A/D analog-to-digital conversion module and transmitting digital signal data to the main control module;

the center-to-center distance from the transmitting wireframe (3) to the receiving wireframe II (6) is at least 4 times the center-to-center distance from the transmitting wireframe (3) to the receiving wireframe I (4); and the unmanned aerial vehicle (8) is controlled to take off to a height above the effective depth detection capability of the receiving wireframe I (4), the sine wave generation module is then controlled to generate signals and electromagnetic waves are transmitted through the transmitting wireframe (3), the main control module reads induced electromotive forces V1, V2 of the receiving wireframe I (4) and the receiving wireframe II (6).

2. The low-altitude frequency domain electromagnetic detection device according to claim 1, wherein the transmitting wireframe (3), the receiving wireframe I (4) and/or the receiving wireframe II (6) are provided with a non-magnetic rigid housing, the enameled wires are fixedly arranged inside the non-magnetic rigid housing; the number of turns of the enameled wires of the receiving wireframe I (4) is 8-12 times the number of turns of the enameled wires of the transmitting wireframe (3).

3. The low-altitude frequency domain electromagnetic detection device according to claim 1, wherein the supporting rod I (1) and the supporting rod II (2) are parallel and of equal length to each other, and two sides of the frame composed of the supporting rod I (1) and the supporting rod II (2) are connected with the unmanned aerial vehicle (8) through four symmetrical anti-torsion ropes (7), respectively; the frame composed of the supporting rod I (1) and the supporting rod II (2) is not less than 5m apart from a foot stand of the unmanned aerial vehicle (8).

4. The low-altitude frequency domain electromagnetic detection device according to claim 1, wherein the main control module further performs Fast Fourier Transform on received time series data acquired by the receiving wireframe I (4) and the receiving wireframe II (6) in seconds to convert the data into an amplitude corresponding to an operating frequency, the normalized secondary field PPM calculation is subsequently performed, and the position coordinate data acquired by the GNSS module and the flight height data acquired by the altimeter module at the same time are collated with the normalized secondary field PPM data, and recorded in the storage module.

5. The low-altitude frequency domain electromagnetic detection device according to claim 4, wherein the normalized secondary field PPM calculation is performed by using an equation (15), an equation (16) and an equation (17):

$$V22 = \frac{nV2 - V1}{n-1}, \tag{15}$$

$$V21 = V2 - V22 = V2 - \frac{nV2 - V1}{n-1}, \tag{16}$$

$$PPM = \frac{V22}{V21}, \quad (17)$$

wherein: V1 is the induced electromotive force of the receiving wireframe I (4), V2 is the induced electromotive force of the receiving wireframe II (6), V21, V22 are the primary field and secondary field induced electromotive forces of the receiving wireframe II (6), respectively, and the unit is V; n is the calibration factor of the receiving wireframe I (4) and the receiving wireframe II (6).

6. An electromagnetic detection method based on the low-altitude frequency domain electromagnetic detection device according to claim 1, comprising the steps of:

A. Equipment assembly: fixing a transmitting wireframe (3), a receiving wireframe I (4), a transmitting and receiving system (5), and a receiving wireframe II (6) in sequence at intervals between a supporting rod I (1) and a supporting rod II (2) which are parallel to form a fixed frame structure, enabling the receiving wireframe I (4) and the receiving wireframe II (6) in signal connection with the dual-channel synchronous data acquisition module (51), respectively and the sine wave generation module, the altimeter module, the GNSS module and the dual-channel synchronous data acquisition module (51) in signal connection with the main module, respectively, and then suspending the fixed frame structure below the unmanned aerial vehicle (8) with a plurality of non-magnetic anti-torsion ropes (7);

B. Coefficient calibration: controlling the unmanned aerial vehicle (8) to take off to a height above the effective depth detection capability of the receiving wireframe I (4), then controlling the sine wave generation module to generate signals and transmitting electromagnetic waves through the transmitting wireframe (3), reading the induced electromotive forces V1, V2 of the receiving wireframe I (4) and the receiving wireframe II (6) by the main control module, then calculating a calibration factor n=V1/V2, and adjusting the amplification intensity of the analog signal of the receiving wireframe II according to n;

C. Data acquisition: controlling the unmanned aerial vehicle (8) to perform operations according to a designed course, controlling the sine wave generation module by the main control module of the transmitting and receiving system (5) and transmitting electromagnetic waves through the transmitting wireframe (3), synchronously receiving the data of the altimeter module, the GNSS module and the dual-channel synchronous data acquisition module (51), recording the position coordinates, the flight height and the induced electromotive force time series data of the receiving wireframe I (4) and the receiving wireframe II (6) in the storage module in real time; and D. Normalized secondary field calculation: performing Fast Fourier Transform on the received time series data acquired by the receiving wireframe I (4) and the receiving wireframe II (6) to convert the data into an amplitude corresponding to an operating frequency by the main control module, performing normalized secondary field PPM calculation subsequently, and collating the position coordinate data acquired by the GNSS module and the flight height data acquired by the altimeter module with the normalized secondary field PPM data according to time, and recording the data in the storage module.

7. The electromagnetic detection method based on the low-altitude frequency domain electromagnetic detection device according to claim 6, wherein in the D step, the normalized secondary field PPM calculation is performed by using an equation (15), an equation (16) and an equation (17):

$$V22 = \frac{nV2 - V1}{n-1}, \quad (15)$$

$$V21 = V2 - V22 = V2 - \frac{nV2 - V1}{n-1}, \quad (16)$$

$$PPM = \frac{V22}{V21}, \quad (17)$$

wherein: V1 is the induced electromotive force of the receiving wireframe I (4), V2 is the induced electromotive force of the receiving wireframe II (6), V21, V22 are the primary field and secondary field induced electromotive forces of the receiving wireframe II (6), respectively, and the unit is V; n is the calibration factor of the receiving wireframe I (4) and the receiving wireframe II (6).

8. The electromagnetic detection method based on the low-altitude frequency domain electromagnetic detection device according to claim 7, further comprising a qualitative judgment step, wherein the qualitative judgment is to use the position coordinates, the flight height and the PPM data recorded in the storage module to qualitatively judge an abnormal geological body with resistivity difference: according to the flight altitude and the PPM data, obtaining the apparent resistivity by using the nomogram searching method, and taking an average value of the apparent resistivity recorded for consecutive 10 s as the background apparent resistivity, when the apparent resistivity is higher than 130% of the average value of the apparent resistivity, qualitatively judging the geological body as a high-resistivity abnormal geological body; when the apparent resistivity is lower than 50% of the average value of the apparent resistivity, qualitatively judging the geological body as a low-resistivity abnormal geological body; when the apparent resistivity is in the range from 50% to 130%, judging the geological body as a normal geological body.

\* \* \* \* \*